United States Patent
Tian et al.

(10) Patent No.: US 9,378,098 B2
(45) Date of Patent: Jun. 28, 2016

(54) METHODS AND SYSTEMS FOR REDUNDANT DATA STORAGE IN A REGISTER

(75) Inventors: Zhixin Tian, Shanghai (CN); Yunfeng He, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 14/399,500

(22) PCT Filed: Jun. 6, 2012

(86) PCT No.: PCT/CN2012/076513
§ 371 (c)(1),
(2), (4) Date: Nov. 6, 2014

(87) PCT Pub. No.: WO2013/181803
PCT Pub. Date: Dec. 12, 2013

(65) Prior Publication Data
US 2015/0121132 A1    Apr. 30, 2015

(51) Int. Cl.
*G06F 11/00* (2006.01)
*G06F 11/14* (2006.01)
*G06F 11/16* (2006.01)
*G06F 9/30* (2006.01)
*G06F 11/10* (2006.01)

(52) U.S. Cl.
CPC ........ *G06F 11/1451* (2013.01); *G06F 9/30105* (2013.01); *G06F 9/30141* (2013.01); *G06F 11/1612* (2013.01); *G06F 11/1096* (2013.01); *G06F 2201/84* (2013.01)

(58) Field of Classification Search
CPC .............. G06F 11/1608; G06F 11/183; G06F 11/1666; G06F 11/167; G06F 11/187; G06F 11/186; G06F 11/10; G06F 11/1451; G06F 11/1612; G06F 11/1096; G06F 9/30105; G06F 9/30141; G06F 2201/84
See application file for complete search history.

(56) References Cited

U.S. PATENT DOCUMENTS

| 4,375,683 A | * | 3/1983 | Wensley | ............... G06F 11/187 |
| | | | | 326/11 |
| 4,519,080 A | | 5/1985 | Snyder, Jr. | |

(Continued)

FOREIGN PATENT DOCUMENTS

| CA | 941976 A1 | 2/1974 |
| CN | 1779649 A | 5/2006 |

(Continued)

OTHER PUBLICATIONS

International Search Report and Written Opinion—PCT/CN2012/076513—ISA/EPO—Mar. 14, 2013.

*Primary Examiner* — Marc Duncan
(74) *Attorney, Agent, or Firm* — Paradice and Li LLP

(57) ABSTRACT

A register structure in an integrated circuit includes a first register element to store a first copy of data, a second register element to store a second copy of the data, and storage cells to store copies of a parity value of the data. The register structure also includes parity computing circuitry, coupled to the first and second register elements, to generate respective parity values of the first and second copies of the data. The register structure further includes a selection circuit to select between the first and second copies of the data based on a comparison of the respective parity values of the first and second copies of the data to a majority value of the copies of the parity value stored in the storage cells.

20 Claims, 2 Drawing Sheets

(56) References Cited

U.S. PATENT DOCUMENTS

| | | | |
|---|---|---|---|
| 5,177,744 A * | 1/1993 | Cesare | G06F 11/1008 714/6.24 |
| 5,193,175 A | 3/1993 | Cutts, Jr. et al. | |
| 5,566,193 A | 10/1996 | Cloonan | |
| 6,118,297 A | 9/2000 | Schenck | |
| 6,289,415 B1 | 9/2001 | Johnson | |
| 7,990,746 B2 | 8/2011 | Rajan | |
| 9,201,726 B2 * | 12/2015 | Morris | G06F 11/0793 |
| 2010/0088565 A1 * | 4/2010 | Chandra | H03K 19/00392 714/746 |
| 2010/0268987 A1 * | 10/2010 | Clark | G06F 9/3867 714/16 |

FOREIGN PATENT DOCUMENTS

| | | |
|---|---|---|
| EP | 0474451 A2 | 3/1992 |
| KR | 20020017634 A | 3/2002 |

\* cited by examiner

METHODS AND SYSTEMS FOR REDUNDANT DATA STORAGE IN A REGISTER

TECHNICAL FIELD

The present embodiments relate generally to data storage, and specifically to redundant data storage in registers.

BACKGROUND OF RELATED ART

Integrated circuits may suffer undesirable effects caused by charged particles such as alpha particles. Single event effects, which are transient effects cause by a single charged particle passing through silicon, are the dominant type of these undesirable effects. The charged particle produces a current pulse in the silicon that perturbs the operation of the integrated circuit. For example, the current pulse resulting from the charged particle can cause random bit inversion of a storage cell, which is referred to as a single event upset. If the storage cell is part of a register, the bit inversion results in incorrect data being stored in the register, which will cause an error when the register is read. Such an error is sometimes referred to as a soft error, because the storage cell remains functional and can be re-written with new data.

The vulnerability of storage cells to single event effects such as single event upset increases as transistor dimensions shrink and voltage supply levels decrease. Single event effects are therefore becoming an increasingly large source of error in integrated circuits.

Existing techniques for mitigating single event effects suffer from significant performance penalties or die area penalties. Accordingly, there is a need for mitigation techniques that are efficient with regard to both performance and die area.

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

Figure 1:
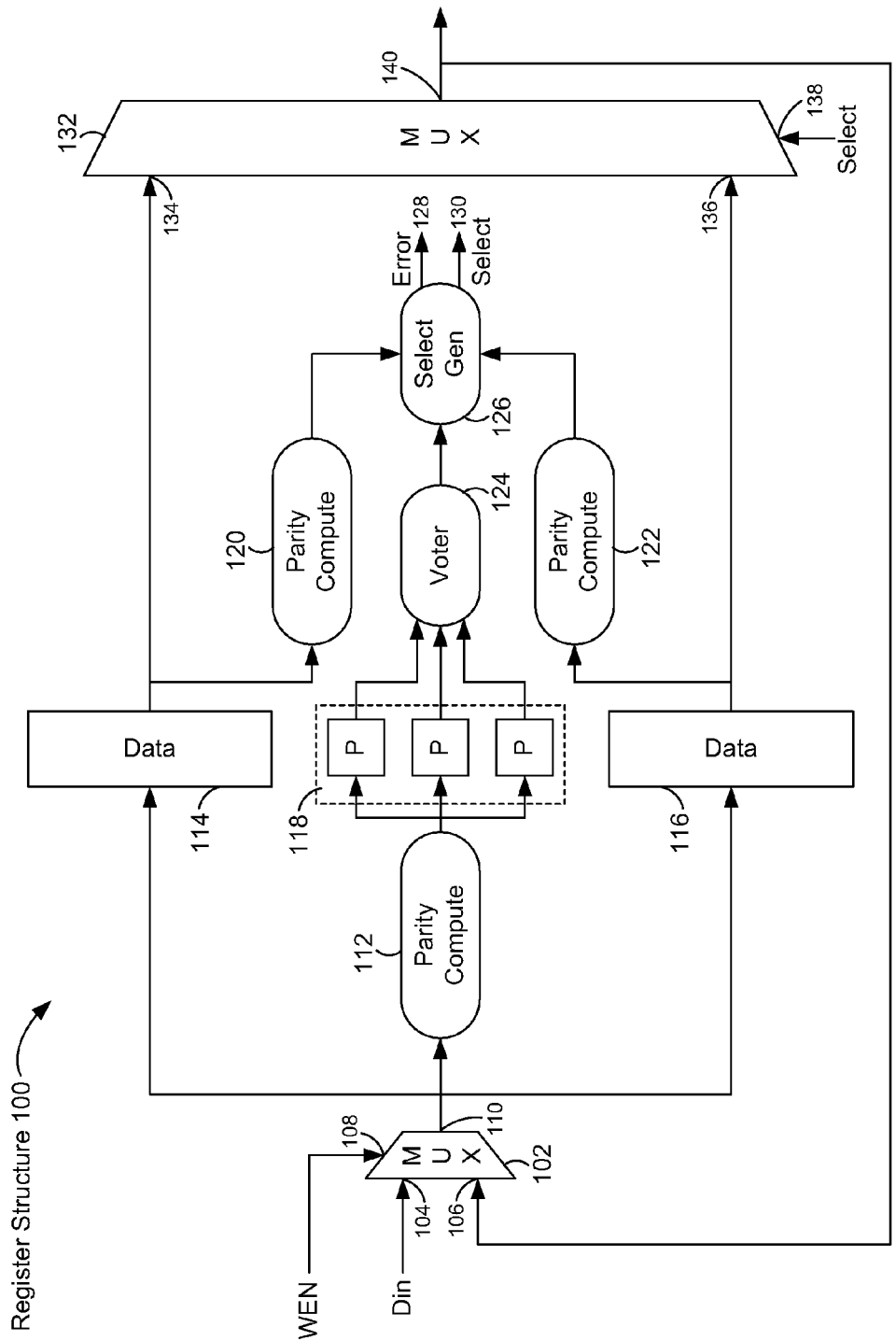
FIG. 1 illustrates a register structure with dual modular redundancy in accordance with some embodiments.

Systems and methods are disclosed for redundantly storing data in an efficient manner.

In some embodiments, a register structure in an integrated circuit includes a first register element to store a first copy of data, a second register element to store a second copy of the data, and storage cells to store copies of a parity value of the data. The register structure also includes parity computing circuitry, coupled to the first and second register elements, to generate respective parity values of the first and second copies of the data. The register structure further includes a selection circuit to select between the first and second copies of the data based on a comparison of the respective parity values of the first and second copies of the data to a majority value of the copies of the parity value stored in the storage cells.

In some embodiments, a method of storing data includes storing a first copy of the data in a first register element, storing a second copy of the data in a second register element, and storing copies of a parity value of the data. The method also includes generating respective parity values of the first and second copies of the data and comparing the respective parity values of the first and second copies of the data to a majority value of the copies of the parity value stored in the storage cells. The method further includes selecting between the first and second copies of the data based on the comparing.

In some embodiments, a register structure in an integrated circuit includes means for storing first and second copies of data, means for storing copies of a parity value of the data, and means for generating respective parity values of the first and second copies of the data. The register structure also includes means for selecting between the first and second copies of the data based on a comparison of the respective parity values of the first and second copies of the data to a majority value of the stored copies of the parity value.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

A register structure in an integrated circuit in accordance with some embodiments implements a dual modular redundancy and error-detection scheme based on parity bits associated with data stored in the register structure. The register stores two copies of its data. A parity value (e.g., a parity bit) associated with the stored data is calculated; the register stores three or more copies of the parity value. In some embodiments, the parity value indicates whether the number of 1's (or 0's) in the stored data is even or odd. Because the parity value is stored using at least triple redundancy, its proper value can still be recovered if one of its copies is corrupted by a single event upset. The proper value is recovered using majority voting. For the example in which three copies of the parity value are stored, if two of the copies have a first value (e.g., 1) and the third copy has a second value (e.g., 0), the first value (e.g., 1) is chosen as the proper value.

When the register is read, the parity value of each copy of the data is calculated and compared to the original, proper parity value as determined by majority voting using the stored copies. A copy of the data is chosen for which the corresponding parity value matches the original, proper parity value. The register structure outputs the chosen copy of the data.

FIG. 1 illustrates a register structure 100 that is an example of such a register in accordance with some embodiments. Input data $D_{in}$ is provided to a first input 104 of an input multiplexer (mux) 102. The mux also includes a second input 106 (discussed below), a control input 108, and an output 110. The output 110 is coupled to a first register element 114, a second register element 116, and a parity computing circuit 112. A write-enable signal (WEN) is provided to the control input 108. In response to assertion of WEN, the mux 102 provides the data $D_{in}$ to the two register elements 114 and 116, each of which stores a copy of the data $D_{in}$. The mux 102 also provides the data $D_{in}$ to the parity computing circuit 112 in response to assertion of WEN. In some embodiments, WEN is considered to be asserted when in a logic-high state; alternatively, WEN is considered to be asserted when in a logic-low state.

The parity computing circuit 112 calculates a parity value for the input data $D_{in}$. In some embodiments, the parity value is a single parity bit that indicates whether the input data $D_{in}$ has even or odd parity. For example, if the number of 1's in the data $D_{in}$ is even, the parity bit has a first value (e.g., 0, or alternatively 1), and if the number of 1's in the data $D_{in}$ is odd, the parity bit has a second value (e.g., 1, or alternatively 0). A value of 1 corresponds to a logic-high value and a value of 0 corresponds to a logic-low value.

The parity computing circuit 112 is coupled to a plurality of storage cells 118, which receive the parity value (e.g., the parity bit) from the parity computing circuit 112. Each of the storage cells 118 stores a copy of the parity value. In some embodiments, the plurality of storage cells 118 includes three storage cells 118.

The plurality of storage cells 118 is coupled to a voting circuit 124, which receives the copies of the parity value from the storage cells 118 and determines a majority value of the copies. For example, assuming there are three storage cells 118, the voting circuit 124 determines that the majority value is 1 if at least two of the copies equal 1 and determines that the majority value is 0 if at least two of the copies equal 0. The voting circuit 124 thus can recover the proper value of the parity value even if a copy stored in one of the storage cells 118 has been corrupted by a single event upset. It is statistically unlikely that copies stored in two of the storage cells would be corrupted by two different single event upsets. However, multiple single event upsets may be accommodated by increasing the number of storage cells 118 beyond three.

The first register element 114 is coupled to a parity computing circuit 120 and the second register element 116 is coupled to a parity computing circuit 122. The parity computing circuits 120 and 122 calculate parity values in the same manner as the parity computing circuit 112. The parity computing circuit 120 calculates a parity value of the copy of the data stored in the first register element 114 and the parity computing circuit 122 calculates a parity value of the copy of the data stored in the second register element 116.

While the register structure 100 is shown to include three parity computing circuits 112, 120, and 122, two or more (e.g., all three) of the circuits 112, 120, and 122 may be replaced with a single parity computing circuit that performs the corresponding functions.

A selection circuit ("Select Gen") 126 is coupled to the parity computing circuits 120 and 122 and the voting circuit 124. The parity computing circuits 120 and 122 provide their corresponding parity values to the selection circuit 126. The voting circuit 124 provides to the selection circuit 126 the majority value of the copies of the parity values stored in the storage cells 118. The selection circuit 126 compares the parity values from the parity computing circuits 120 and 122 to the majority value and, based on the comparison, selects either the data copy in the first register element 114 or the data copy in the second register element 116. If the data copy in a respective register element 114 or 116 has not been corrupted by a single event upset, then the parity value (e.g., parity bit) for that copy should match the majority value. A mismatch between the parity value for a copy of the data and the majority value suggests that a bit in the copy has been corrupted (e.g., by a single event upset).

If the parity value for the data copy in the first register element 114, as provided by the parity computing circuit 120, matches the majority value, but the parity value for the data copy in the second register element 116, as provided by the parity computing circuit 122, does not match the majority value, then the selection circuit 126 selects the data copy in the first register element 114. If the parity value for the data copy in the first register element 114, as provided by the parity computing circuit 120, does not match the majority value, and the parity value for the data copy in the second register element 116, as provided by the parity computing circuit 122, matches the majority value, then the selection circuit 126 selects the data copy in the second register element 116. If the parity values for the data copies in both the first and second register elements 114 and 116 match the majority value, then the selection circuit 126 arbitrarily selects one of the two data copies (e.g., the selection circuit 126 defaults to the data copy in either the first or second register element 114 or 116).

When data is to be read from the register structure 100, the selection circuit 126 generates a selection signal ("Select") specifying the selected data copy and provides the selection signal on an output 130, which is coupled to a control input 138 of an output mux 132. The output mux 132 also includes a first input 134 coupled to the first register element 114, a second input 136 coupled to the second register element 116, and an output 140. If the select signal specifies the data copy in the first register element 114, then the first input 134 is coupled to the output 140 and the data copy stored in the first register element 114 is provided on the output 140. If the select signal specifies the data copy in the second register element 116, then the second input 136 is coupled to the output 140 and the data copy stored in the second register element 116 is provided on the output 140. The output 140 thus provides a data copy with a parity value that matches the majority value of the copies of the parity value in the storage cells 118. This data copy is assumed to be uncorrupted and thus equal to the original data Din.

A feedback path from the output 140 of the output mux 132 to the second input 106 of the input mux 102 provides the selected data copy to the first mux 102. When WEN is not asserted, the mux 102 provides the selected data copy to the first and second register elements 114 and 116. Potentially corrupted data in the register elements 114 and 116 are thus overwritten with the selected data copy, which is presumed to be correct, thereby refreshing the data copies in the register elements 114 and 116. This process of refreshing the register elements 114 and 116 further increases the tolerance of the register structure 100 to single event upsets: if the register elements 114 and 116 are refreshed between a first single event upset and a second single event upset, the original data $D_{in}$ can still be read from the register. Refreshing the register elements 114 and 116 removes the data corruption caused by the first single event upset.

If neither the parity value for the data copy in the first register element 114 nor the parity value for the data copy in the second register element 116 matches the majority value, the selection circuit 126 asserts an error signal ("Error") provided on an output 128. When asserted, the error signal indicates that data read from the register structure 100 is not reliable. Such an error may result, for example, if a bit in each of the register elements 114 and 116 has been corrupted (e.g., by single event upsets) or if two of the storage cells 118 have been corrupted (e.g., by single event upsets). No error message results, however, if a bit in one of the register elements 114 or 116 has been corrupted and one of the storage cells 118 has been corrupted; in this case, the selection circuit 126 can still identify the uncorrupted data copy.

In some embodiments, the error signal is provided to an interrupt controller, which triggers an interrupt in response to the error signal. During the interrupt, the data stored in the register structure 100 is refreshed by fetching the desired data from memory (e.g., from cache memory, main memory, or external memory such as a hard disk drive). In some embodiments, the error signal is provided to a voltage controller for the integrated circuit that includes the register structure 100. The voltage controller may increase a voltage level of a power supply for the integrated circuit in response to the error signal (or in response to a determination that a number of error signals has exceeded a threshold), because increasing the supply voltage decreases the likelihood of single event upsets.

Figure 2:
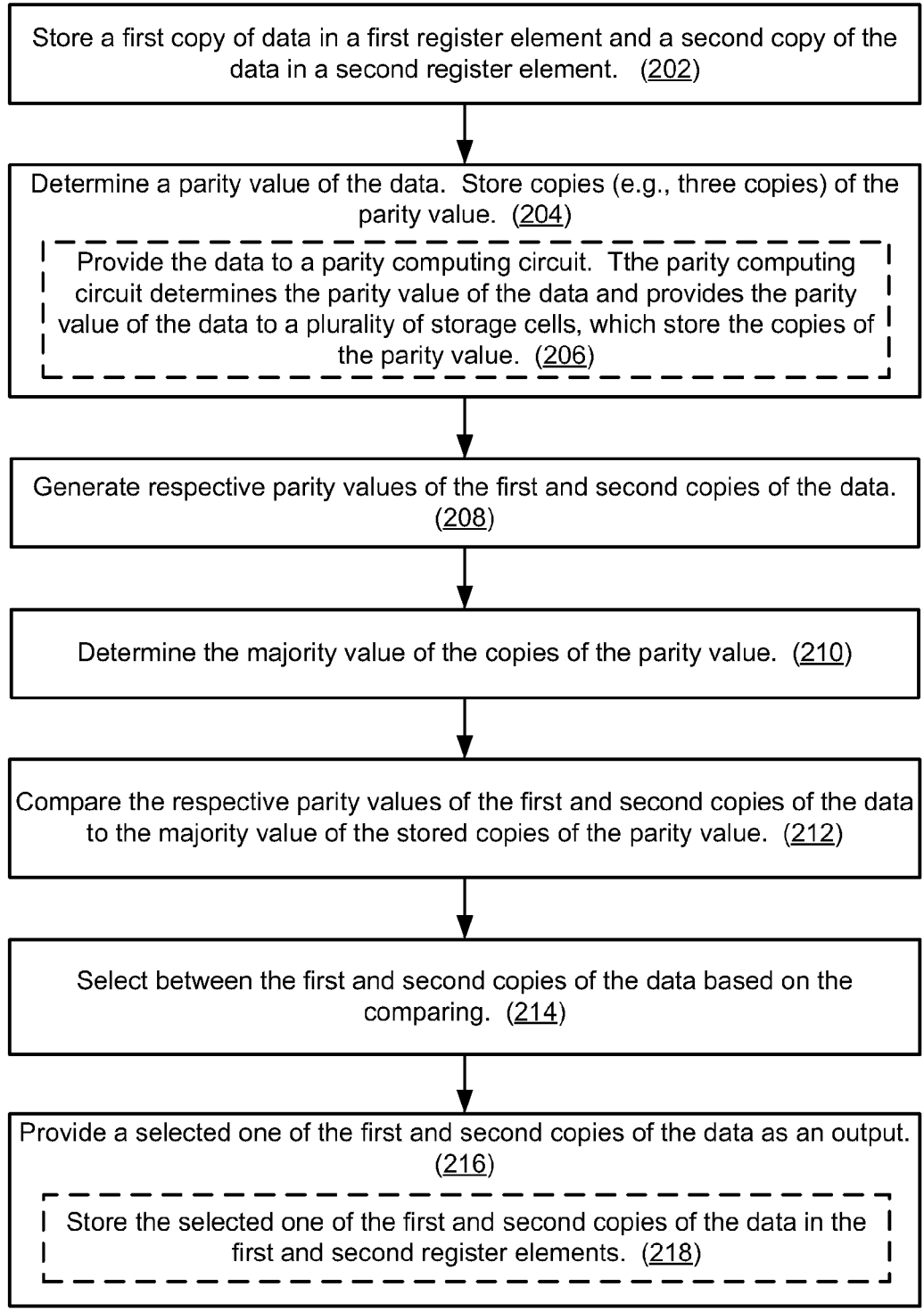
FIG. 2 is a flow diagram illustrating a method of storing data in accordance with some embodiments.

FIG. 2 is a flow diagram illustrating a method 200 of storing data in accordance with some embodiments. In some embodiments, the method 200 is performed using the register structure 100 (FIG. 1) or a similar register structure.

A first copy of data is stored (202) in a first register element (e.g., register element 114, FIG. 1) and a second copy of the data is stored in a second register element (e.g., register element 116, FIG. 1). In some embodiments, copies of the data are provided to the respective register elements in response to assertion of a write-enable signal (e.g., in response to the asserted WEN signal being provided to the input mux 102, FIG. 1).

A parity value of the data is determined (204) and copies (e.g., three copies) of the parity value are stored. In some embodiments, the data are provided (206) to a parity computing circuit (e.g., circuit 112, FIG. 1), which determines the parity value of the data and provides the parity value of the data to a plurality of storage cells (e.g., storage cells 118, FIG. 1), where the copies of the parity value are stored. In some embodiments, the data are provided to the parity computing circuit in response to assertion of the write-enable signal (e.g., in response to the asserted WEN signal being provided to the input mux 102, FIG. 1)

Respective parity values of the first and second copies of the data are generated (208). For example, parity computing circuits 120 and 122 (FIG. 1) determine the respective parity values of the first and second copies of the data. The majority value of the copies of the parity value is determined (210). For example, the voting circuit 124 (FIG. 1) determines the majority value.

The respective parity values of the first and second copies of the data are compared (212) to the majority value of the stored copies of the parity value (e.g., using the selection circuit 126, FIG. 1). Based on the comparing, a selection is made (214) between the first and second copies of the data. In some embodiments, making this selection includes generating a selection signal (e.g., as provided on output 130 of the selection circuit 126, FIG. 1) that specifies a selected one of the first and second copies of the data.

The selected one of the first and second copies of the data is provided (216) as an output. For example, either the first or second copy of the data is provided by the output 140 of the output mux 132 (FIG. 1), in accordance with the selection signal. In some embodiments, the selected one of the first and second copies of the data is also stored (218) in the first and second register elements, to refresh the register elements.

While the method 200 includes a number of operations that appear to occur in a specific order, it should be apparent that the method 200 can include more or fewer operations, some of which can be executed serially or in parallel. An order of two or more operations may be changed and two or more operations may be combined into a single operation.

The register structure 100 and method 200 provide efficient techniques for redundant data storage in a register. The die area associated with these techniques is low, because only two copies of the data are stored in accordance with some embodiments and because the values being compared are parity values, which are small (e.g., are single-bit values). Also, selecting data based on a comparison of parity values is not computationally intensive and does not impose a significant performance penalty.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A register structure in an integrated circuit, comprising:
a first register element to store a first copy of data;
a second register element to store a second copy of the data;
storage cells to store copies of a parity value of the data;
parity computing circuitry, coupled to the first and second register elements, to generate respective parity values of the first and second copies of the data; and
a selection circuit to select between the first and second copies of the data based on a comparison of the respective parity values of the first and second copies of the data to a majority value of the copies of the parity value stored in the storage cells.

2. The register structure of claim 1, further comprising a voting circuit, coupled to the storage cells and the selection circuit, to determine the majority value of the copies of the parity value stored in the storage cells.

3. The register structure of claim 2, wherein:
the storage cells comprise three storage cells, each to store a copy of the parity value of the data; and
the voting circuit is to determine the majority value of the three copies of the parity value of the data.

4. The register structure of claim 1, wherein:
the parity computing circuitry is first parity computing circuitry; and
the register structure further comprises second parity computing circuitry, coupled to the storage cells, to determine the parity value of the data and provide the parity value of the data to the storage cells.

5. The register structure of claim 4, further comprising an input circuit to provide the data to the first register element, the second register element, and the second parity computing circuitry in response to a write-enable signal.

6. The register structure of claim 5, wherein the input circuit comprises an input multiplexer.

7. The register structure of claim 1, wherein the parity computing circuitry comprises:
a first parity computing circuit, coupled to the first register structure and the selection circuit, to generate the parity value of the first copy of the data; and
a second parity computing circuit, coupled to the second register structure and the selection circuit, to generate the parity value of the second copy of the data.

8. The register structure of claim 1, wherein:
the selection circuit comprises an output to provide a selection signal indicating a result of the comparison; and
the register structure further comprises an output multiplexer comprising a first input coupled to the first register element, a second input coupled to the second register element, a control input to receive the selection signal, and an output to provide either the first or second copy of the data in accordance with the selection signal.

9. The register structure of claim 8, wherein:
the output of the selection circuit is a first output; and
the selection circuit further comprises a second output to provide an error signal generated based on the result of the comparison.

10. The register structure of claim 8, further comprising an input multiplexer comprising a first input to receive the data, a second input coupled to the output of the output multiplexer, and an output coupled to the first and second register elements.

11. The register structure of claim 10, wherein the input multiplexer further comprises a control input to receive a write-enable signal and is configured to couple its first input to the first and second register elements when the write-enable signal is asserted and to couple its second input to the first and second register elements when the write-enable signal is de-asserted.

12. A method of storing data, comprising:
storing a first copy of the data in a first register element;
storing a second copy of the data in a second register element;
storing copies of a parity value of the data;
generating respective parity values of the first and second copies of the data;
comparing the respective parity values of the first and second copies of the data to a majority value of the stored copies of the parity value; and
selecting between the first and second copies of the data based on the comparing.

13. The method of claim 12, wherein:
storing the copies of the parity value of the data comprises storing three copies of the parity value of the data; and
the majority value is a majority value of the three copies.

14. The method of claim 12, wherein a plurality of storage cells stores the copies of the parity value of the data, the method further comprising:
determining the parity value of the data; and
providing the parity value of the data to the plurality of storage cells.

15. The method of claim 12, further comprising:
providing the first and second copies of the data to the first and second register elements in response to assertion of a write-enable signal;
providing the data to a parity computing circuit in response to the assertion of the write-enable signal, wherein the parity computing circuit determines the parity value of the data; and
providing the parity value of the data to a plurality of storage cells that stores the copies of the parity value of the data.

16. The method of claim 12, further comprising:
based on the selecting, providing a selected one of the first and second copies of the data as an output; and
providing the output to the first and second register elements when a write-enable signal is de-asserted.

17. The method of claim 12, wherein:
the selecting comprises generating a selection signal that specifies a selected one of the first and second copies of the data; and
the method further comprises providing the selected one of the first and second copies of the data as an output, in accordance with the selection signal.

18. The method of claim 17, further comprising storing the selected one of the first and second copies of the data in the first and second register elements.

19. The method of claim 12, further comprising generating an error signal based on the comparing.

20. A register structure in an integrated circuit, comprising:
means for storing first and second copies of data;
means for storing copies of a parity value of the data;
means for generating respective parity values of the first and second copies of the data; and
means for selecting between the first and second copies of the data based on a comparison of the respective parity values of the first and second copies of the data to a majority value of the stored copies of the parity value.

* * * * *